CIRCUITS FOR GENERATING PULSES WHOSE DURATION IS CONTROLLED BY DELAY MEANS OR EXTERNAL CIRCUITS

Filed May 24, 1960 7 Sheets-Sheet 1

INVENTORS
LASZLO L. RAKOCZI &
LINO M. PAOLETTI
BY John V. Regan
ATTORNEY

Oct. 15, 1963 L. M. PAOLETTI ETAL 3,107,332

CIRCUITS FOR GENERATING PULSES WHOSE DURATION IS CONTROLLED BY DELAY MEANS OR EXTERNAL CIRCUITS

Filed May 24, 1960 7 Sheets-Sheet 2

INVENTORS
LASZLO L. RAKOCZI &
BY LINO M. PAOLETTI
John V. Regan
ATTORNEY

INVENTORS
LASZLO L. RAKOCZI &
BY LINO M. PAOLETTI
John V. Regan
ATTORNEY

Oct. 15, 1963 L. M. PAOLETTI ETAL 3,107,332
CIRCUITS FOR GENERATING PULSES WHOSE DURATION IS CONTROLLED
BY DELAY MEANS OR EXTERNAL CIRCUITS
Filed May 24, 1960 7 Sheets-Sheet 4

INVENTORS
LASZLO L. RAKOCZI &
BY LINO M. PAOLETTI
John V. Regan
ATTORNEY

INVENTORS
LASZLO L. RAKOCZI &
LINO M. PAOLETTI
BY John V. Regan
ATTORNEY

INVENTORS
LASZLO L. RAKOCZI &
LINO M. PAOLETTI
BY John V. Regan
ATTORNEY

INVENTORS
LASZLO L. RAKOCZI &
LINO M. PAOLETTI
BY John V. Regan
ATTORNEY 3,107,332

CIRCUITS FOR GENERATING PULSES WHOSE DURATION IS CONTROLLED BY DELAY MEANS OR EXTERNAL CIRCUITS

Lino M. Paoletti, Philadelphia, Pa., and Laszlo L. Rakoczi, Merchantville, N.J., assignors to Radio Corporation of America, a corporation of Delaware Filed May 24, 1960, Ser. No. 31,335

14 Claims. (Cl. 328—63)

This invention relates to a new and improved generator of pulses either of fixed or controllable duration. The invention is useful, among other places, in data processing equipment; and the embodiments for generating pulses of controllable duration find special application in "asynchronous" digital computers.

An objective of the invention is to provide a control pulse generator suitable for use in data processing equipment which is highly versatile and yet which is relatively simple and inexpensive.

Another objective of the invention is to provide a control pulse generator which is capable of asynchronous pulse generation, that is, which can produce pulses of a duration dependent upon the times required by various circuits in a digital computer to perform their functions.

Another objective of the invention is to provide a control pulse generator of the type employing delay lines to determine pulse lengths which uses fewer delay lines than comparable prior art pulse generators.

Another objective of the invention is to provide a control pulse generator which cannot operate in a "race condition." The latter is a condition in which various logic gates which should be inactive are spuriously actuated and produce undesired spurious control pulses.

The system of the invention includes circuit means for starting one timing pulse, a circuit to which the timing pulse is applied for producing a delayed output signal, means responsive to the output signal for starting another timing pulse, and circuit means responsive to the start of the other timing pulse for terminating the one timing pulse.

The invention is described in greater detail in the following description and in the following drawings in which.

Throughout the figures similar reference characters are applied to similar elements.

The individual blocks shown in the figures above are in themselves conventional. The block are actuated by electrical signals applied to the blocks. When the signal is at one level, it represents the binary digit "one" and when it is at another level, it represents the binary digit "zero." For the sake of the discussion which follows, it may be assumed that a high level signal represents the binary digit "one" and a low level one the binary digit "zero." Also, to simplify the discussion, rather than speaking of an electrical signal being applied to a block, it will hereafter be stated that a "one" or a "zero" is applied to the block.

The various logic circuits illustrated in the figures operate as follows. A multiple input "and" gate is one which produces a "one" output only when all of the inputs to the "and" gate are "one." At all other times it produces a "zero" output. A multiple input "or" gate produces a "one" output when one or more of the inputs to the "or" gate is "one" and a "zero" output when all of the inputs to the "or" gate are "zero." A multiple input "none" gate produces a "one" output when all of the inputs to the gate are "zero" and a "zero" output when one or more than one of the inputs are "one." This gate may consist of an inverter for each input lead and an "and" gate to which the inverted inputs are applied. The flip-flops shown in the circuits employing "and" gates produce a "one" output at the unbarred (for example, A) output terminal and a "zero" output at the other ($\overline{A}$) terminal when set; and a "one" output at the barred ("not") output terminal (for example, $\overline{A}$) and a "zero" output at the A terminal when reset. The flip-flops in the circuits employing "none" gates are similar to the above flip-flops except that the output (on input) terminals are effectively interchanged.

In other words, these flip-flops produce a "one" output at the barred terminal when set and a "one" output at the unbarred terminal when reset. These flip-flops with interchanged outputs are designated "I-O Flip-Flops."

Figure 1:
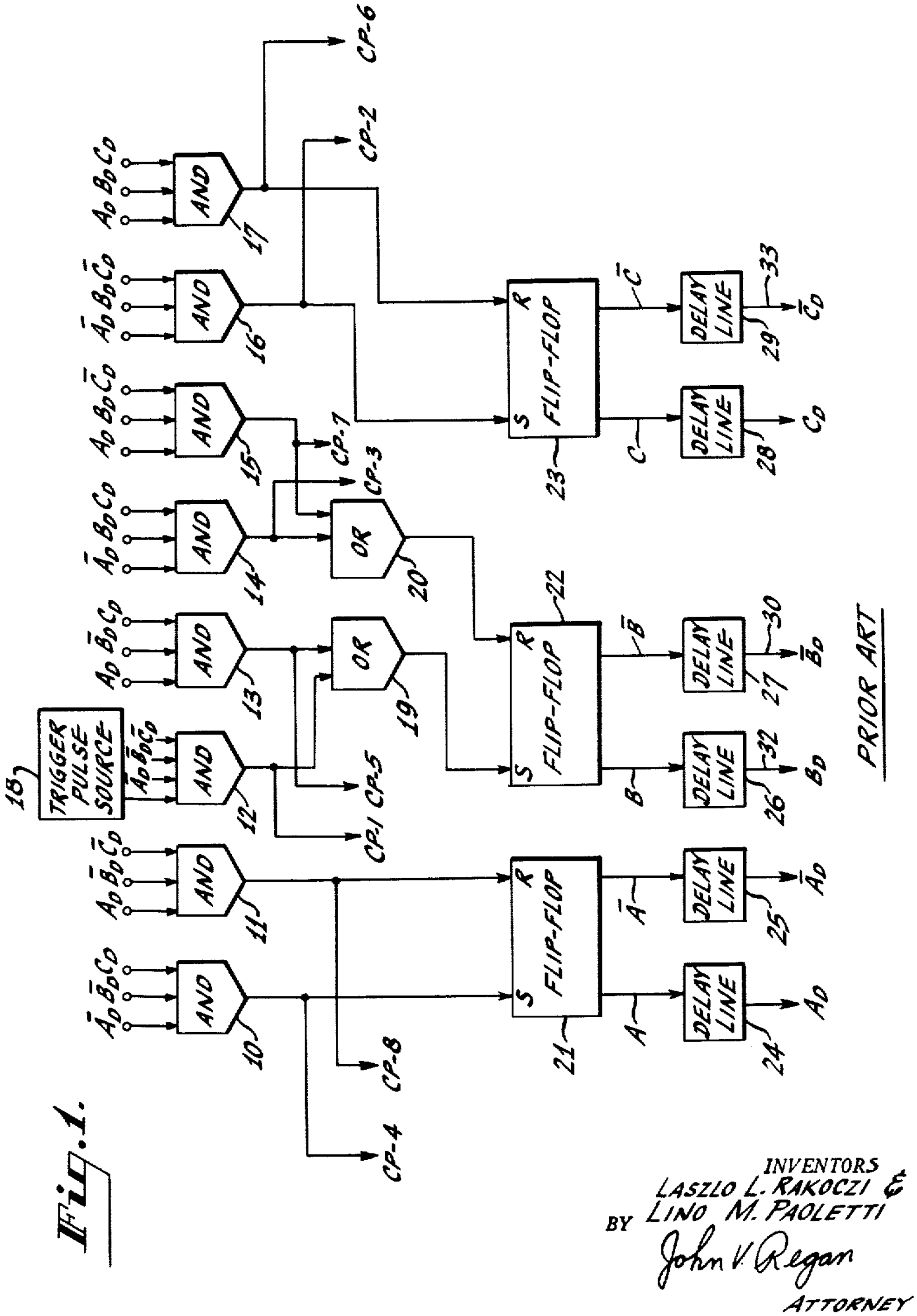
FIG. 1 is a block circuit diagram of a prior art control pulse generator.

A circuit representative of the prior art is shown in FIG. 1. The brief discussion which follows of this circuit is to emphasize some of the limitations of the prior art and how they are overcome in the circuits of the invention. The circuit of FIG. 1 includes eight "and" gates 10–17 inclusive, a trigger pulse source 18 connected to one of the "and" gates, and a pair of "or" gates 19 and 20 connected to certain of the "and" gates. The "and" gates are connected either directly or through the "or" gates to flip-flops 21–23. The flip-flops are connected to various ones of delay lines 24–29 inclusive. The delay line outputs are connected back to various input terminals of the "and" gates 10–17, as shown.

Flip-flops 21–23 are initially all reset. This means that A, B, and C all equal "zero" and $\overline{A}$, $\overline{B}$, and $\overline{C}$ all equal "one." To start the circuit operation, a trigger pulse from source 18 is applied to "and" gate 12. This "and" gate now has four "one" inputs applied thereto and produces the first control pulse CP–1. CP–1 is applied through "or" gate 19 to the set (S) input of flip-flop 22. This changes B from "zero" to "one" and $\overline{B}$ from "one" to "zero." The $\overline{B}$ input is delayed by delay line 27, and after the delay interval imparted by the delay line, output level $\overline{B}_D=0$ appears at output lead 30. $\overline{B}_D$ is one of the inputs to "and" gate 12 so that when $\overline{B}_D=0$, the output control pulse $CP=1$ terminates. The duration of control pulse CP–1 is therefore equal to the delay of delay line 27.

When flip-flop 22 is set, B changes from "zero" to "one." After the delay imparted by delay line 26, $B_D=1$ appears at output lead 32. $B_D$ is one of the inputs to "and" gate 16 and since the other two inputs $\overline{A}_D$ and $\overline{C}_D$ are equal to "one," when $B_D$ changes from "zero" to "one," "and" gate 16 is enabled. The output of "and" gate 16 is a control pulse CP–2 and, since it must start when control pulse CP–1 terminates, delay line 26 must introduce a delay equal to that of delay line 27.

Control pulse CP–2 sets flip-flop 23 so that its outputs change from $C=0$ to $C=1$ and from $\overline{C}=1$ to $\overline{C}=0$. The $\overline{C}=0$ output is delayed by delay line 29 and after a period equal to this delay, a $\overline{C}_D=0$ output level appears at output lead 33. Since this is one of the inputs to "and" gate 16, control pulse CP–2 ends at this time. The duration of CP–2 is equal to the delay of delay line 29.

The $C_D$ output of delay line 28 is one of the inputs to "and" gate 14. When it equals "one," "and" gate 14 is enabled since the other two inputs are also "one" and the control pulse CP–3 starts. The remainder of the circuit operation is quite straightforward and follows readily from the foregoing explanation.

The circuit of FIG. 1 is a synchronous pulse generator. In other words, the pulses are all of fixed duration and, generally speaking, are all of the same duration. It should be noted that the "and" gates leading to each flip-flop are controlled by the outputs of the same flip-flop. For example, "and" gate 10 is turned off in response to $\overline{A}_D=0$, one of the outputs of flip-flop 21 connected to that "and" gate. Also, each flip-flop in the circuit requires two delay lines and, if the control pulses produced are to be of the same duration, the delay lines should be fairly closely matched.

In some computer applications it is desirable that certain of the control pulses be of one duration and others of another duration. Assume, for example, that there is a situation in which control pulses CP–1 and CP–2 are each required to be one microsecond in duration. Referring to FIG. 1, this means that delay line 27, which controls the duration of control pulse CP–1, must also be of one microsecond duration. Since control pulse CP–2 in this circuit must begin when control pulse CP–1 ends, delay line 26 must also be one microsecond long (the delay line 26 output enables "and" circuit 16 to start producing the control pulse CP–2). If control pulse CP–2 is to be one microsecond long, delay line 28 must also have a delay of one microsecond. For reasons similar to those given above, if delay line 28 has a one microsecond delay, then delay line 29 has a one microsecond delay. It may also be observed in FIG. 1 that delay lines 26 and 27 determine the durations of control pulses CP–5 and CP–7. Accordingly, the requirement that control pulses CP–1 and CP–2 each be one microsecond in duration means in effect that six of the eight output pulses, namely CP–1, CP–2, CP–3, CP–5, CP–6, and CP–7, also have to be one microsecond in duration. Delay lines 24 and 25 can have different delays so that control pulses CP–4 and CP–8 can have different durations than the other control pulses.

In summary, the circuit of FIG. 1 is limited in application when attempted to be used as an asynchronous pulse generator. It can be used as a synchronous pulse generator but it is fairly expensive since two delay lines are required for each flip-flop. The delay lines are relatively costly and, since they may have to be duplicated many thousands of times in a computer, the requirement for their use considerably adds to the expense of a computer. Moreover, the delay lines are a source of possible equipment malfunction, since in practical applications it is generally found advisable to use active rather than passive elements in the line.

Figure 2:
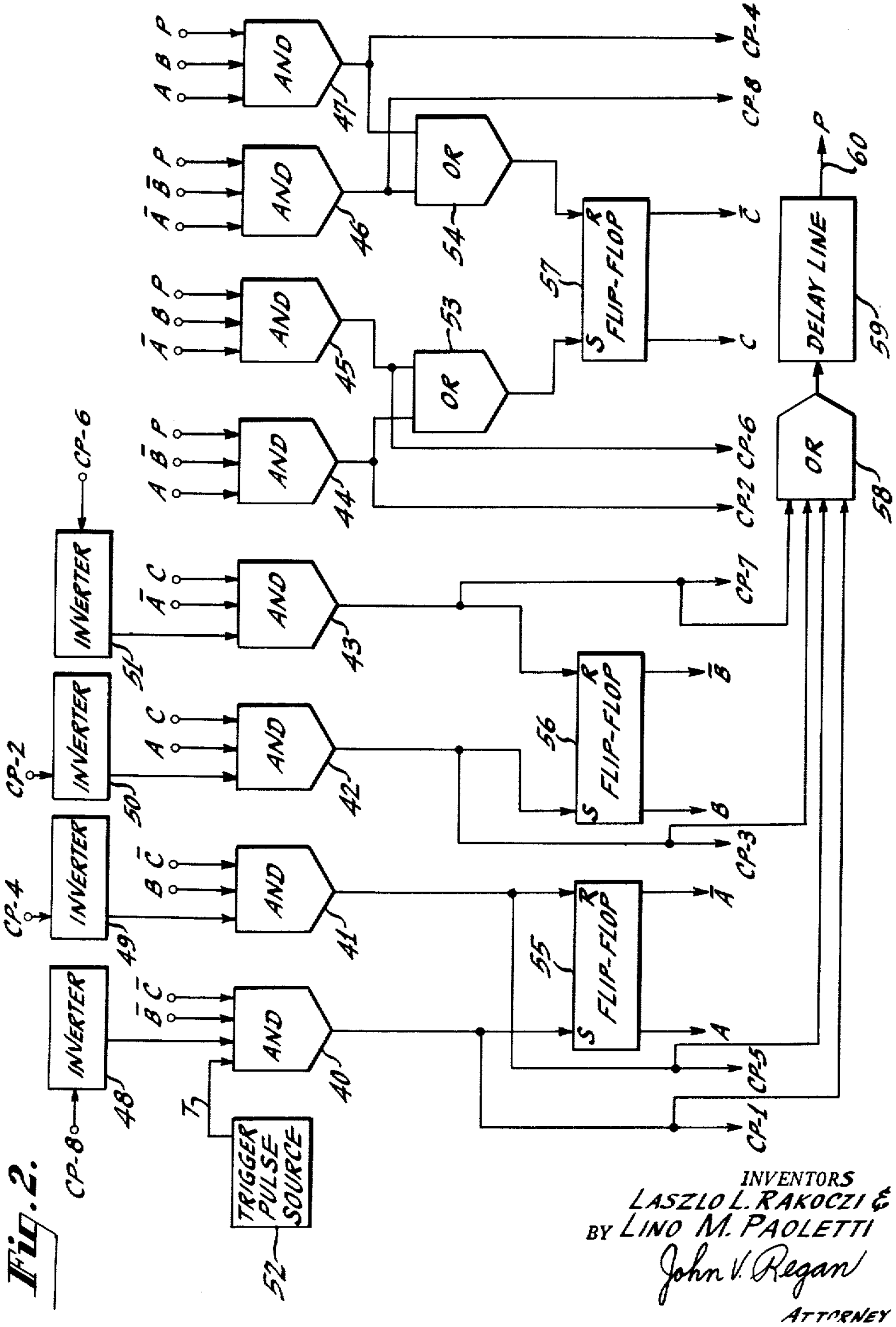
FIG. 2 is a block circuit diagram of a control pulse generator according to the present invention for producing pulses of fixed duration.

An improved control pulse generator according to the present invention is shown in FIG. 2. One advantage of the circuit is that only a single delay line is required when the pulse generator is operated synchronously. Another advantage is that it is possible to obtain a much broader range of asynchronous operation than with the circuit of FIG. 1. One important reason why this is so is that a flip-flop connected to an "and" gate (an "and" gate which produces a control pulse) does not feed its output back to that "and" gate. Instead, that "and" gate is commanded to terminate the control pulse it produces in response to a signal derived from the start of the succeeding control pulse.

The circuit of FIG. 2 includes, by way of example, eight "and" gates 40–47, inverters 48–51 connected to certain of the "and" gates and a trigger pulse source 52 connected to the "and" gate producing the first control pulse. Two "or" circuits 53 and 54 receive outputs of certain of the "and" gates. The "and" gates are connected either directly or through the "or" gates to flip-flops 55—57 inclusive. In the form of the invention illustrated, a third "or" circuit 58 applies four of the control pulses to a delay line 59. Various of the output pulses or levels are applied back as inputs to the "and" gates, either directly or through one of the inverters.

Figure 3:
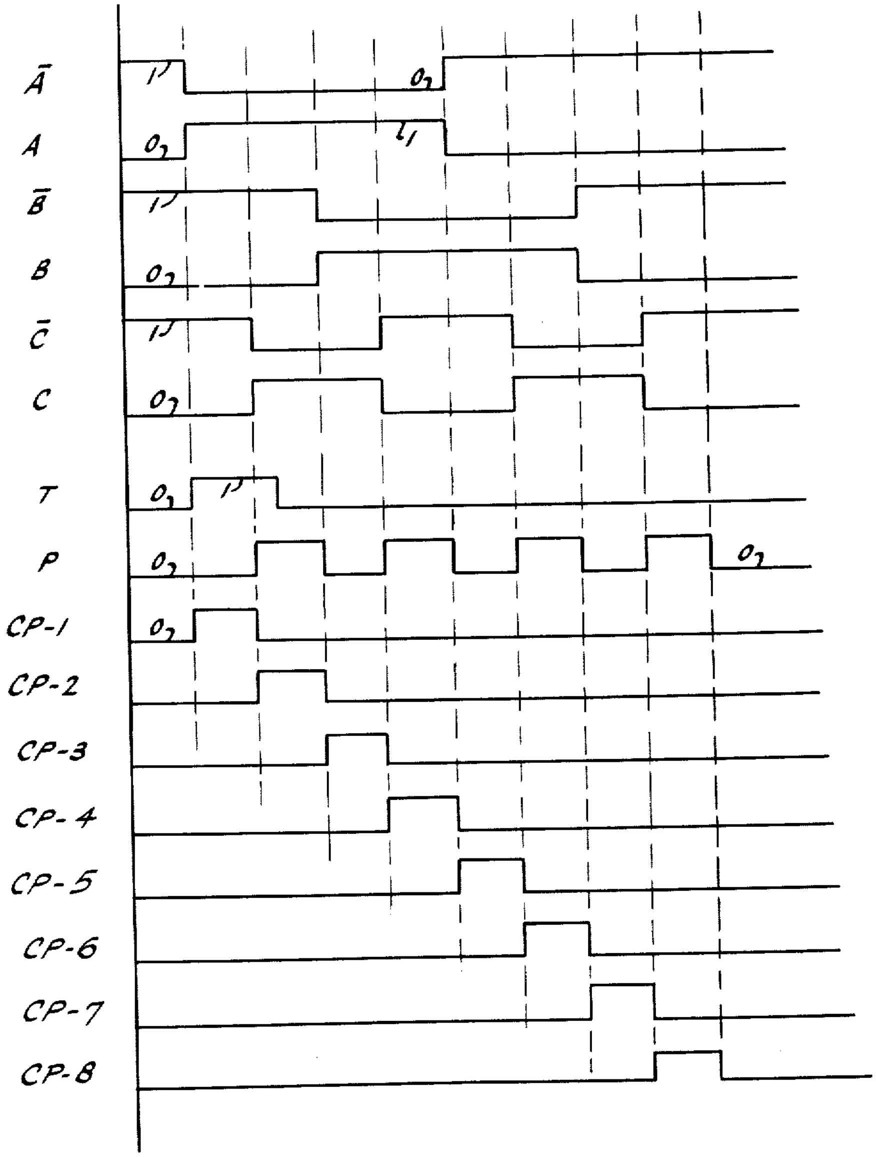
FIG. 3 is a drawing of waveforms present at various points in the circuit of FIG. 2.

In the explanation of circuit operation which follows, FIGS. 2 and 3 should both be referred to. The flip-flops 55–57 are all initially reset so that the A, B, and C outputs are "zero" and the $\overline{A}$, $\overline{B}$, and $\overline{C}$ outputs are "one." To start the control pulse cycle, a trigger pulse T is applied from source 52 to "and" gate 40. Control pulse CP–8 is assumed to be absent so that the output of inverter 48 is a "one." Accordingly, the four inputs to "and" gate 40 are "one" and control pulse CP–1 starts. This pulse is applied through "or" gate 58 to delay line 59 and, after the delay imparted by the line, an output level $P=1$ appears at lead 60.

$P=1$ is one of the inputs of "and" gate 44. The other two inputs A and $\overline{B}$ are also "one." $\overline{B}=1$ because flip-flop 56 is still reset and $A=1$ because pulse CP–1 has set flip-flop 55. A "one" output appears at the output of "and" gate 44 and this is the start of control pulse CP–2. This "one" output is applied through "or" gate 53 and sets flip-flop 57. This changes $\overline{C}$ from "one" to "zero" so that "and" gate 40 is inactivated and control pulse CP–1 terminates.

Summarizing the operation above, a trigger pulse T starts control pulse CP–1. The control pulse is applied to a circuit including "or" gate 58 and delay line 59 which produces a delayed output signal P. As will be seen shortly, the delay interval determines the duration of control pulse CP–1. This output signal P is applied to another circuit "and" gate 44 which starts another timing pulse CP–2. Still another circuit, "or" gate 53 and flip-flop 57, is responsive to the start of the control pulse CP–2 for terminating control pulse CP–1 (changing the $\overline{C}=1$ input to $\overline{C}=0$).

After a time equal to the delay line length, P changes from "one" to "zero." This inactivates gate 44 and stops control pulse CP–2. It might be mentioned here that since control pulse CP–2 starts when P goes from "zero" to "one" and stops when P goes from "one" to "zero," this control pulse has a duration equal to the delay introduced by the delay line, just as control pulse CP–1.

When control pulse CP–2 terminates, the output of inverter 50 changes from a "zero" to a "one" and, since the other two inputs A and C are both "one," "and" gate 42 is enabled. In other words, the termination of control pulse CP–2 signals control pulse CP–3 to start. Control pulse CP–3 sets flip-flop 56 and is applied through "or" gate 58 to delay line 59. The remainder of the circuit operation is easily traced with the aid of FIG. 3.

The circuit shown in FIG. 2 is synchronous. All pulses are precisely the same duration since all are controlled by a single delay line 59. This avoids problems of tolerances such as may occur with the prior art circuit of FIG. 1. The circuit is also considerably less expensive than the circuit of FIG. 1. Moreover, pulses of different duration may easily be obtained with the circuit of FIG. 2. For example, if CP–1 is applied to a one microsecond delay line, then control pulses CP–1 and CP–2 are both one microsecond long. With a second delay line employed to which control pulse CP–3 is applied, then the length of control pulses CP–3 and CP–4 will both be determined by the length of this line. For example, these pulses may be made 20 microseconds long with a second delay line 20 microseconds long. It is clear that control pulses CP–5 and 6 and CP–7 and 8 may also be made of different lengths than control pulses CP–1 and 2 by using additional third and fourth delay lines of appropriate length.

Figure 4:
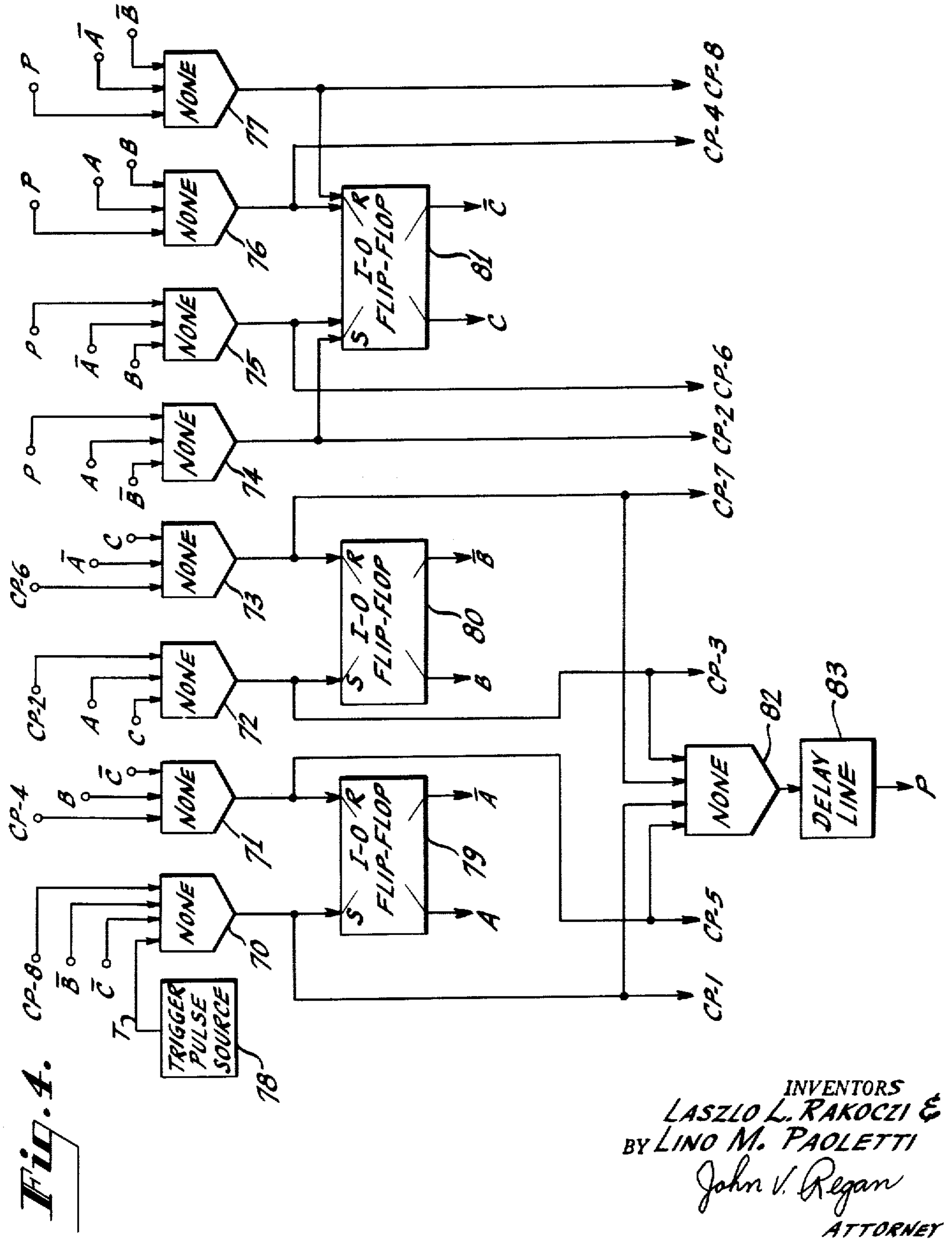
FIG. 4 is a block circuit diagram of another form of the present invention for producing pulses of fixed duration.

A circuit which functions similarly to the circuit of FIG. 2 but which has somewhat different circuit components is shown in FIG. 4. The principal difference between the circuits is that the one of FIG. 4 uses "none" gates rather than "and" gates. The flip-flops have their output leads interchanged, and become the "I-O flip-flops" mentioned above, so that when reset, the A output, for example, is "one" and the $\overline{A}$ output "zero," and when set the $\overline{A}$ output, for example, is "one" and the A output is "zero."

The circuit of FIG. 4 includes eight "none" gates 70–77 and a trigger pulse source 78 connected to one of the "none" gates. The output of source 78 is normally "one," and becomes "zero" for the duration of the pulse. The outputs of the "none" gates are applied to flip-flops 79–81. Some of the control pulse outputs are applied through "none" gate 82 to a delay line 83. The P output of the delay line and other outputs of the circuit are fed back as inputs to the "none" gates.

Figure 5:
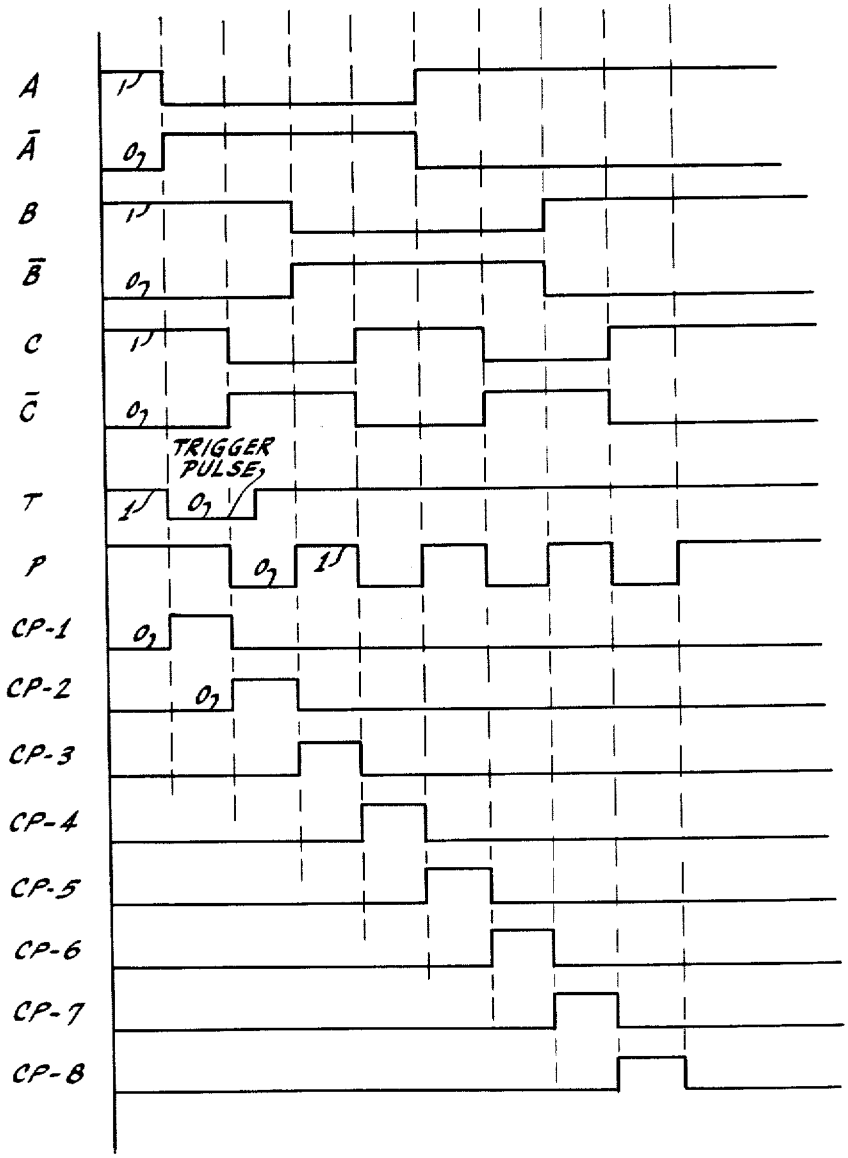
FIG. 5 is a drawing of waveforms present at various points in the circuit of FIG. 4.

In the description of the circuit operation which follows, FIG. 4, and FIG. 5 which is a drawing of waveforms present at various places in the circuit of FIG. 4, should both be referred to. The flip-flops are initially all reset so that A, B, and C are "one" and $\overline{A}$, $\overline{B}$, and $\overline{C}$ are "zero." When a trigger pulse $T=0$ is applied to "none" gate 70, the four inputs to the "none" gate are "zero." This enables the "none" gate and the control pulse CP–1 starts. This control pulse sets flip-flop 79 and is applied through "none" gate 82 to delay line 83. Assume the delay line to be one microsecond long. After one microsecond, P changes from "one" to "zero" thereby enabling "none" gate 74. This starts control pulse CP–2 which sets flip-flop 81. The $\overline{C}$ output therefore changes from "zero" to "one" disabling "none" gate 70 and terminating control pulse CP–1. After an additional microsecond (the duration of control pulse CP–1), P changes from "zero" to "one" disabling "none" gate 74 and terminating control pulse CP–2. When CP–2 changes from "one" to "zero," "none" gate 72 is enabled and control pulse CP–3 starts. The remainder of the circuit operation may readily be traced with the aid of FIG. 5.

In the embodiments of FIGS. 2 and 4, the duration of the trigger pulses from sources 52 and 78, respectively, is not critical so long as it is longer than control pulse CP–1 and terminates before control pulse CP–8 terminates. Also, in both circuits one set of eight control pulses is produced in response to each trigger pulse input. After the eight control pulses, another set can be produced in response to another trigger pulse input.

The circuit of FIG. 4 can produce pulses of different fixed durations rather than all of the same durations by using additional delay lines, just as in the circuit of FIG. 2.

Figure 6:
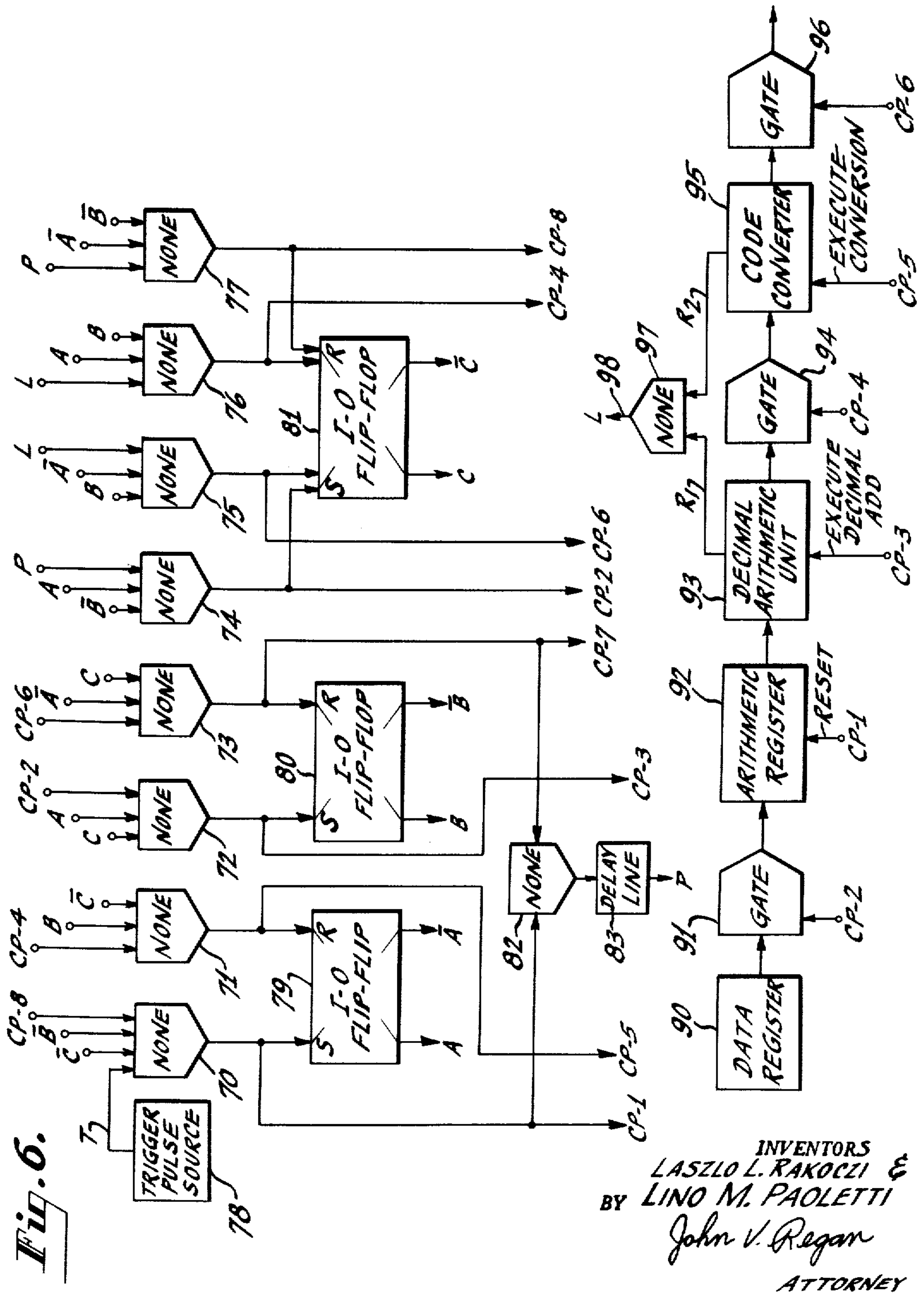
FIG. 6 is a block circuit diagram of another form of control pulse generator according to the invention, this one for producing pulses of controllable duration, and of certain logic circuits in a digital computer controlled by the control pulse generator.

A semi-asynchronous pulse generator according to the invention is illustrated in FIG. 6. The term "semi-asynchronous" implies that some of the pulses generated are of fixed duration and others are of controllable duration. The network is modeled after the circuit of FIG. 4 and similar reference numerals have been applied to similar parts. There is also shown at the bottom of the figure a part of a conventional logic network in a computer. The network includes a data register 90 connected through a gate 91 to an arithmetic register 92. The arithmetic register is reset by a first control pulse CP–1, gate 91 is then actuated by a control pulse CP–2 and additional data passes from data register 90 into the arithmetic register.

The aritmetic register is connected to a decimal arithmetic unit 93. Its function, for example, may be to add the input binary information. The unit is commanded to perform the addition by control pulse CP–3. The sum which is obtained is applied through a gate 94, which is actuated in response to control pulse CP–4, to a code converter 95. This stage is commanded to execute the conversion by control pulse CP–5. When the operation is completed, the information obtained is gated through gate 96 in response to control pulse CP–6.

Some of the operations discussed above occur in fixed time intervals. On the other hand, certain of the operations require an amount of time which depends upon the make-up of the input information. For example, it takes the decimal arithmetic unit a much shorter interval of time to add addend and augend words made up mostly of "zeros" than to add the same words made up mostly of "ones." In the worst case it may take the adder 20 microseconds to perform its function and in the best only one microsecond. The same holds for the code converter. If the control pulse generator were synchronous, one would have to allow the maximum time interval, that is, 20 microseconds for the adder and code converter to perform their operations under all circumstances, that is, regardless of whether the input words were mostly "zeros" or mostly "ones." This is, of course, wasteful of time. It would be advantageous to be able to operate the network in a completely asynchronous manner, that is, to start the next operation as soon as the unit has completed its function.

The embodiment of the invention shown in FIG. 6 is capable of the type of operation described above. In the discussion of this operation which follows, FIGS. 6 and 7 should both be referred to. Control pulse CP–1 starts when trigger pulse T from source 78 is applied to "none" gate 70. Again, as in FIGS. 2 and 4, the duration of the trigger pulse T is not critical. The control pulse sets flip-flop 79 and is applied through "none" gate 82 to delay line 83. The control pulse CP–1 is also applied to reset the arithmetic register 92. This is a synchronous operation and therefore control pulse CP–1 is of fixed duration.

Assume delay line 83 to have a one microsecond delay, and that one microsecond is also the duration desired for the control pulse CP–1. After one microsecond, pulse P appears at the output of the delay line. This pulse is applied to "none" gate 74 actuating the "none" gate and starting control pulse CP–2. Control pulse CP–2 sets flip-flop 81 changing $\overline{C}$ from "zero" to "one." This inactivates "none" gate 70 which terminates control pulse CP–1.

After an additional microsecond, P changes from "zero" back to "one" inactivating "none" gate 74 and terminating control pulse CP–2. The control pulse CP–2 is also applied to gate 91 and commands the gate to pass additional information to register 92.

When control pulse CP–2 terminates, "none" gate 72 is actuated and control pulse CP–3 starts. This control pulse sets flip-flop 80. The control pulse is also applied to the decimal arithmetic unit and commands this unit to execute the add function. The arithmetic unit is asyychronous. After the unit has completed the addition, it produces an output signal $R_1=1$. This signal is applied to "none" gate 97 and an $L=0$ output appears at 98. $L=0$ is one of the inputs to "none" gate 76 and since the other two inputs A and B are both "zero," "none" gate 76 is actuated and control pulse CP–4 starts.

Control pulse CP–4 resets flip-flop 81 changing C from "zero" to "one." C is one of the inputs to "none" gate 72 and when it changes from "zero" to "one," "none" gate 72 is inactivated and control pulse CP–3 stops.

Figure 7:
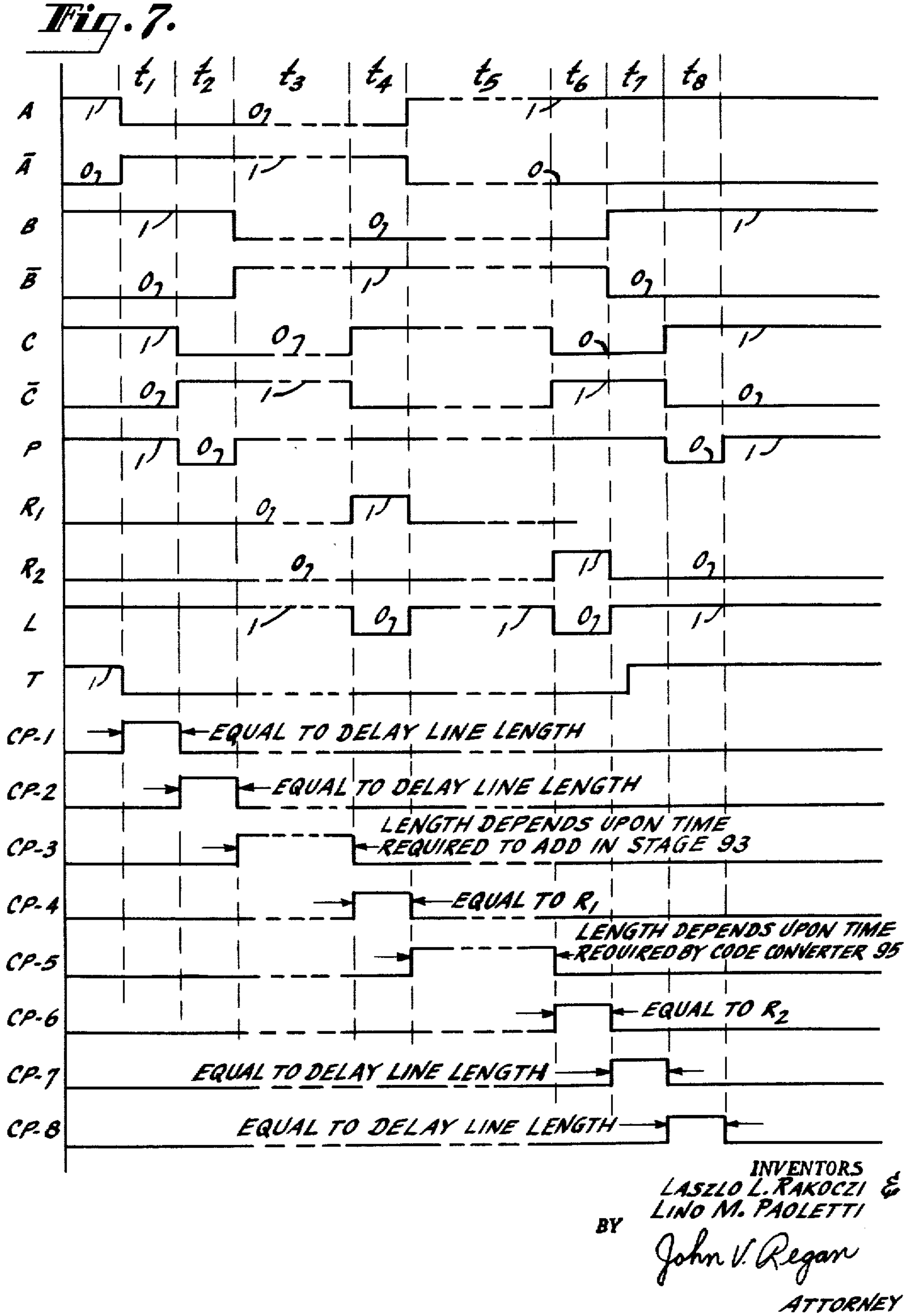
FIG. 7 is a drawing of waveforms present at various points in the circuit of FIG. 6.

Referring for a moment to FIG. 7, it can be seen that CP–1 and CP–2 have a length equal to the delay of delay line 83. Control pulse CP–3, on the other hand, is of variable length and depends in each case on the time required by the decimal arithmetic unit to complete its function. The control pulse CP–4 starts when and only when control pulse CP–3 stops.

When L changes from "zero" back to "one," control pulse CP–4 stops. L changes from "zero" to "one" when $R_1$ changes from "one" to "zero." Accordingly, the duration of control pulse CP–4 is equal to that of pulse $R_1$. Pulse $R_1$ can be of any duration desired so that pulse CP–4 can be of any duration desired.

When control pulse CP–4 terminates, "none" gate 71 is actuated since the three inputs to this gate are now all "zero." This starts control pulse CP–5. The remainder of the circuit operation can readily be followed by referring to the waveforms of FIG. 7.

In the circuit of FIG. 6, control pulses CP–3 and CP–5 have a duration which is equal to the time required by the logic stages 93 and 95, respectively, to perform their functions, control pulses CP–4 and CP–6 are equal to pulses $R_1$ and $R_2$ and the remainder of the control pulses are of fixed duration. It should be appreciated that with minor circuit revision any of the pulses can be made synchronous and any of the pulses asynchronous. For example, if rather than applying a P input to "none" gate 74, an L input which is functionally dependent upon a signal $R_n$ is applied, then CP–2 begins when $R_n$ begins. This means that control pulse CP–1 will have a duration which is equal to the time required by the logic stage producing $R_n$ (to which CP–1 is applied), to perform its function. It is also clear that a now controllable duration pulse can be made of fixed duration by applying to one of the "none" gates, a pulse P rather than a pulse L, for example.

The semi-asynchronous pulse generator of FIG. 6 is based on the one of FIG. 4. In a similar manner, an asynchronous pulse generator can be made which is based on the circuit of FIG. 2. The circuit differences are as follows. Only pulses CP–1 and CP–7 are applied to delay line 59 through "or" circuit 58; pulses $R_1$ and $R_2$ are generated in response to control pulses CP–3 and CP–5, respectively, and these pulses $R_1$ and $R_2$ each produce a pulse L; pulses L rather than P are applied to the gates 45 and 47.

The various pulse generators described above are each capable of producing eight control pulses. It is to be appreciated, of course, that the invention is applicable to the generation of more or fewer than eight pulses. In general, the greater the number of flip-flops employed, the greater the number of control pulses which can be produced. If there are $n$ such flip-flops, $2^n$ pulses are possible.

What is claimed is:

1. In a system for generating control pulses, in combination, circuit means including a "none" gate for starting one control pulse; a circuit to which the one control pulse is applied for producing an outlet signal which is delayed with respect to the start of the control pulse; means including another "none" gate responsive to the output signal for starting another control pulse; and circuit means including a flip-flop responsive to the start of the other control pulse for terminating the one control pulse.

2. In a system for generating control pulses, in combination, a circuit including a multiple input first logic gate for starting one control pulse; a first flip-flop responsive to the control pulse for producing a signal; circuit means to which the control pulse is applied for producing a signal which is delayed with respect to the start of the control pulse; means including a multiple input second logic gate responsive to a plurality of signals including one from said first flip-flop and one from said circuit means for starting another control pulse; and a second flip-flop responsive to the start of the other control pulse and serving as one of the inputs to the first logic gate for terminating the one control pulse.

3. In a system for generating control pulses, in combination, a circuit including a multiple input first "none" gate for starting one control pulse; a first flip-flop responsive to the control pulse for producing a signal; circuit means to which the control pulse is applied for producing a signal which is delayed with respect to the start of the control pulse; means including a multiple input second "none" gate responsive to a plurality of signals including one from said first flip-flop and one from said circuit means for starting another control pulse; and a second flip-flop responsive to the start of the other control pulse and serving as one of the inputs to the first logic gate for terminating the one control pulse.

4. In a system for generating control pulses, in combination, a circuit including a multiple input first "and" gate for starting one control pulse; a first flip-flop responsive to the control pulse for producing a signal; circuit means to which the control pulse is applied for producing a signal which is delayed with respect to the start of the control pulse; means including a multiple input second "and" gate responsive to a plurality of signals including one from said first flip-flop and one from said circuit means for starting another control pulse; and a second flip-flop responsive to the start of the other control pulse and serving as one of the inputs to the first logic gate for terminating the one control pulse.

5. In a system for generating control pulses, in combination, a circuit including a multiple input first logic gate for starting one control pulse; a first flip-flop responsive to the control pulse for producing a signal; circuit means for producing a signal which is delayed a fixed interval with respect to the start of the pulse; means including a multiple input second logic gate responsive to a plurality of signals including one from said first flip-flop and one derived from said circuit means for starting another control pulse; a flip-flop responsive to the start of the other control pulse and serving as one of the inputs to the first logic gate for inactivating the first logic gate; asynchronous circuit means to which the other control pulse is applied for producing a signal when the pulse is of a desired, controllable duration; means responsive to this last-named signal for starting a third control pulse; and means responsive to the start of the third control pulse for terminating said other control pulse.

6. In a system for generating control pulses, a plurality of flip-flops, each having a set and reset connection; and at least one multiple input logic gate applying an output to each said connection, respectively, for setting and resetting the flip-flops, and each logic gate receiving inputs only from flip-flops other than the one to which it is coupled.

7. In a system for generating $2^n$ control pulses, where $n$ is an integer greater than one; $n$ flip-flops; and $2n$ multiple input logic gates, at least two connected to each flip-flop, and each logic gate receiving an output voltage from all flip-flops except the one to which it is connected.

8. In a system for generating control pulses, a plurality of flip-flops each having a set and reset connection; at least one multiple input logic gate coupled to each said connection for setting and resetting the flip-flops, and each logic gate receiving inputs only from flip-flops other than the one to which it is coupled; and a delay line connected to receive an output of at least one said logic gate for applying an input to another said logic gate, said other logic gate actuating a flip-flop connected back to said one logic gate.

9. In a system for generating control pulses, a plurality of flip-flops each having a set and reset connection; at least one multiple input logic gate coupled to each said connection for setting and resetting the flip-flops, and each logic gate receiving inputs only from flip-flops other than the one to which it is coupled; and a delay line for applying a control signal to some of said logic gates in response to signals received from other of said logic gates.

10. In a system for generating control pulses, a plurality of flip-flops each having a set and reset connection; at least one multiple input logic gate coupled to each said connection, respectively, each for producing a control pulse which sets or resets the flip-flop to which the logic gate is connected, each logic gate receiving inputs only from flip-flops other than the one to which it is coupled; and a delay line connected to receive a plurality of said control pulses for relaying the pulses and then applying them to logic gates other than those from which the pulses are received.

11. In a system for generating control pulses, a plurality of flip-flops each having a set and reset connection; at least one multiple input "none" gate coupled to each connection for setting and resetting the flip-flops, and each "none" gate being connected to receive inputs only from flip-flops other than the one to which it is coupled; a delay line connected to receive an output of at least one said "none" gate for applying an input to another said "none" gate; and an asynchronous circuit connected to receive an output from at least a third one of said "none" gates for applying an input, after a desired time duration, to a fourth one of said "none" gates.

12. In a system for generating $2^n$ control pulses; $n$ flip-flops; $2n$ multiple input logic gates, at least two connected to each flip-flop, and each logic gate receiving an output signal form all flip-flops except the one to which it is connected; and a single delay line receiving the output signal from some of said logic gates and applying the same, after delay, to other of said logic gates.

13. In a system for generating a control pulse of duration $\Delta t$, in combination, circuit means for starting one control pulse; a circuit to which the control pulse is applied for producing an output signal which is delayed an interval $\Delta t$ with respect to the start of said control pulse; means responsive to the output signal for starting another control pulse the leading edge of which occurs an interval $\Delta t$ after the leading edge of the one control pulse; and circuit means responsive to the leading edge of the other control pulse for terminating the one control pulse said interval $\Delta t$ after the start of said one control pulse.

14. In a system for generating control pulses of duration $\Delta t$, in combination, gate circuit means for starting one control pulse the leading edge of which occurs at a reference time; a circuit including an asynchronous logic stage which requires a variable interval $\Delta t$ to perform its logic function to which the one control pulse is applied for producing an output signal which is delayed said interval $\Delta t$ with respect to said reference time; means, including a second gate circuit means, responsive to said output signal for starting another control pulse the leading edge of which occurs said interval $\Delta t$ after said reference time; and circuit means responsive to the start of the other control pulse for terminating the one control pulse said interval $\Delta t$ after the start of said one control pulse.

References Cited in the file of this patent

UNITED STATES PATENTS

| | | |
|---|---|---|
| 2,642,527 | Kelley | June 16, 1953 |
| 2,941,152 | Gosslau | June 14, 1960 |
| 2,964,735 | Abbott | Dec. 13, 1960 |
| 2,972,111 | Hoover | Feb. 14, 1961 |

UNITED STATES PATENT OFFICE
CERTIFICATE OF CORRECTION

Patent No. 3,107,332 October 15, 1963

Lino M. Paoletti et al.

It is hereby certified that error appears in the above numbered patent requiring correction and that the said Letters Patent should read as corrected below.

Column 2, line 27, for "(on input) read -- (or input) --; column 7, line 56, for "outlet" read -- output --; column 9, line 9, for "relaying" read -- delaying --; line 27, for "form" read -- from --.

Signed and sealed this 21st day of April 1964.

(SEAL)
Attest:
ERNEST W. SWIDER

Attesting Officer

EDWARD J. BRENNER

Commissioner of Patents